(12) United States Patent
Santangelo

(10) Patent No.: US 7,473,061 B1
(45) Date of Patent: Jan. 6, 2009

(54) MOTORCYCLE TURNTABLE SYSTEM

(76) Inventor: Lawrence Santangelo, 4348 Harborpointe Dr., Port Richey, FL (US) 34668

( * ) Notice: Subject to any disclaimer, the term of this patent is extended or adjusted under 35 U.S.C. 154(b) by 146 days.

(21) Appl. No.: 11/710,366

(22) Filed: Feb. 23, 2007

(51) Int. Cl.
*B60P 7/08* (2006.01)

(52) U.S. Cl. .............. 410/1; 410/3; 410/67; 248/349.1; 104/44

(58) Field of Classification Search .............. 410/1, 410/3, 4, 7, 23, 30, 66, 67; 248/349.1; 104/35, 104/44–46; 193/35 R; 414/782
See application file for complete search history.

(56) References Cited

U.S. PATENT DOCUMENTS

| | | | |
|---|---|---|---|
| 2,205,320 A | 12/1935 | Waalkes | |
| 4,901,647 A | 2/1990 | Drabing | |
| 6,467,746 B1 | 10/2002 | Paskiewicz | |
| 7,033,119 B2 | 4/2006 | Baker | |
| 7,160,068 B2 * | 1/2007 | Scialabba et al. | .............. 410/7 |

* cited by examiner

*Primary Examiner*—Stephen Gordon
(74) *Attorney, Agent, or Firm*—Louis J. Brunoforte

(57) ABSTRACT

A rotatable support assembly formed of pivotable sections has upper and lower surfaces and tapered end edges. A riding strip fabricated of an elastomeric material extends over the upper surface from tapered end edge to tapered end edge. A carousel assembly includes a fixed lower section, a rotatable upper section, and equally spaced rollers between the upper and lower sections. A locking assembly includes wells formed into the upper surface. A circular plate has an upper aperture and a locking tab with a lower aperture. The locking assembly also includes a pin extending through the upper and lower apertures. A coil spring between the apertures urges the pin downwardly into a locked orientation to preclude rotation of the support assembly.

7 Claims, 4 Drawing Sheets

MOTORCYCLE TURNTABLE SYSTEM

BACKGROUND OF THE INVENTION

1. Field of the Invention

The present invention relates to a motorcycle turntable system and more particularly pertains to supporting and turning motorcycles and other vehicles in a safe and convenient manner.

2. Description of the Prior Art

The use of turntables of known designs and configurations is known in the prior art. More specifically, turntables of known designs and configurations previously devised and utilized for the purpose of turning vehicles through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 2,025,320 issued Dec. 24, 1935 to Waalkes relates to a Turntable. U.S. Pat. No. 4,901,647 issued Feb. 20, 1990 to Drabing relates to a Motorcycle Maneuvering Device. U.S. Pat. No. 6,467,746 issued Oct. 22, 2002 to Paskiewicz relates to a Vehicle Turnabout. Lastly, U.S. Pat. No. 7,033,119 issued Apr. 25, 2006 to Baker relates to a Vehicle Support Platform.

While these devices fulfill their respective, particular objectives and requirements, the aforementioned patents do not describe a motorcycle turntable system that allows supporting and turning motorcycles and other vehicles in a safe and convenient manner.

In this respect, the motorcycle turntable system according to the present invention substantially departs from the conventional concepts and designs of the prior art, and in doing so provides an apparatus primarily developed for the purpose of supporting and turning motorcycles and other vehicles in a safe and convenient manner.

Therefore, it can be appreciated that there exists a continuing need for a new and improved motorcycle turntable system which can be used for supporting and turning motorcycles and other vehicles in a safe and convenient manner. In this regard, the present invention substantially fulfills this need.

SUMMARY OF THE INVENTION

In view of the foregoing disadvantages inherent in the known types of turntables of known designs and configurations now present in the prior art, the present invention provides an improved motorcycle turntable system. As such, the general purpose of the present invention, which will be described subsequently in greater detail, is to provide a new and improved motorcycle turntable system and method which has all the advantages of the prior art and none of the disadvantages.

To attain this, the present invention essentially comprises a motorcycle turntable system. First provided is a rotatable support assembly. The support assembly is formed of a central section and end sections. Each section has an upper surface and a lower surface. Each section has hinges. The hinges pivotably couple the end sections to the central section. In this manner movement is provided between open and folded orientations. The open orientation features the upper surfaces of the central. The open orientation features end sections in an essentially common extended plane. In this manner supporting and turning is facilitated. Note FIG. 1. The folded orientation features the upper surfaces of the end sections resting upon the upper surface of the central section. In this manner carrying is facilitated. Note FIG. 4. The end sections have tapered end edges. The tapered end edges are provided remote from the hinges. The support assembly has a length of about 8 feet. The support assembly has generally square end sections. The support assembly has a width of about 2 feet. The support assembly further has a generally circular central section. The circular central section has a diameter of about 3 feet. The support assembly is fabricated of aluminum.

A riding strip is provided. The riding strip is in a generally rectangular configuration. The riding strip extends over the majority of the upper surface from tapered end edge to tapered end edge. The riding strip is fabricated of an elastomeric material. The elastomeric material is selected from the class of elastomeric materials. The class of elastomeric materials includes plastic and rubber, natural and synthetic, and blends thereof.

Provided next is a plurality of recesses. The recesses are formed on the upper surface of each end section. The recesses have a tie down ring. The tie down ring is pivotally secured in each recess. Each tie down ring is adapted to be pivoted down into an associated recess. Each tie down ring is further adapted to be pivoted up for receiving a strap. The strap is adapted to hold down a motorcycle on the support assembly. Note FIG. 3.

A carousel assembly is provided. The carousel assembly includes a fixed lower section and a rotatable upper section. The lower section has an inner circular vertical wall. The lower section has interior and exterior extensions. The interior extensions have apertures. The apertures receive bolts. In this manner securement to a support surface, such as a garage floor, is provided. The exterior extension constitutes a lower ring-like guideway. The upper section has a circular plate. The circular plate is fabricated of steel. The circular plate has a circular flange. The circular flange is coupled to the circular plate. The circular flange includes an upper ring-like guideway. The upper ring-like guideway is provided over the lower ring-like guideway. An outer circular vertical wall is provided. The outer vertical wall is concentric with the inner circular vertical wall. The carousel assembly also includes a plurality of equally spaced rollers. The rollers are preferably about 46 in the preferred embodiment. The rollers are rotatably supported on the inner circular vertical wall of the fixed lower section between the inner and outer vertical circular walls. A lower ring-like guideway is provided below and adapted to receive thereon the circular plate and rotatable support assembly.

A plurality of rotatable support casters is provided next. The rotatable support casters depend from the lower surface of each section of the support assembly. The casters and the spaced rollers are adapted to support the weight of the rotatable support assembly and a motorcycle thereon and to maintain the majority of the upper surfaces of the sections at a height of about 2 inches from a support surface. The tapered ends are within 0.25 inches from a support surface.

Further provided is a locking assembly. The locking assembly includes a plurality of wells. The wells are formed into the upper surface of the central section. Each well has there below an upper aperture through the circular plate and a locking tab. A lower aperture is provided. The lower aperture extends from a central extent of the vertical wall of the lower section of the carousel assembly. The locking assembly also includes a pin. The pin has a handle and a lower extent. The lower extent extends through the upper and lower apertures. A finger is provided. The finger extends from the pin. A coil spring is provided. The coil spring is provided between the apertures. The coil spring urges the pin downwardly into a locked orientation. In this manner rotation of the support assembly is precluded. The handle is adapted to be raised to lift the pin from the lower aperture. In this manner the support assembly may be rotated to rotate a motorcycle supported thereon.

Provided last is a latch. The latch holds the tapered end edges together. Handles are provided on the central section. Then handles facilitate carrying.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved motorcycle turntable system which has all of the advantages of the prior art turntables of known designs and configurations and none of the disadvantages.

It is another object of the present invention to provide a new and improved motorcycle turntable system which may be easily and efficiently manufactured and marketed.

It is further object of the present invention to provide a new and improved motorcycle turntable system which is of durable and reliable constructions.

An even further object of the present invention is to provide a new and improved motorcycle turntable system which is susceptible of a low cost of manufacture with regard to both materials and labor, and which accordingly is then susceptible of low prices of sale to the consuming public, thereby making such motorcycle turntable system economically available to the buying public.

Even still another object of the present invention is to provide a motorcycle turntable system for supporting and turning motorcycles and other vehicles in a safe and convenient manner.

Lastly, it is an object of the present invention to provide a new and improved motorcycle turntable system. A rotatable support assembly is formed of pivotable sections. The support assembly has upper and lower surfaces with tapered end edges. A riding strip extends over the upper surface from tapered end edge to tapered end edge. The riding strip is fabricated of an elastomeric material. A carousel assembly includes a fixed lower section and a rotatable upper section. The carousel assembly includes equally spaced rollers. The rollers are provided between the upper and lower sections. A locking assembly includes wells. The wells are formed into the upper surface. A circular plate is provided. The circular plate has an upper aperture and a locking tab with a lower aperture. The locking assembly also includes a pin. The pin extends through the upper and lower apertures. A coil spring is provided between the apertures. The coil spring urges the pin downwardly into a locked orientation. In this manner rotation of the support assembly is precluded.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
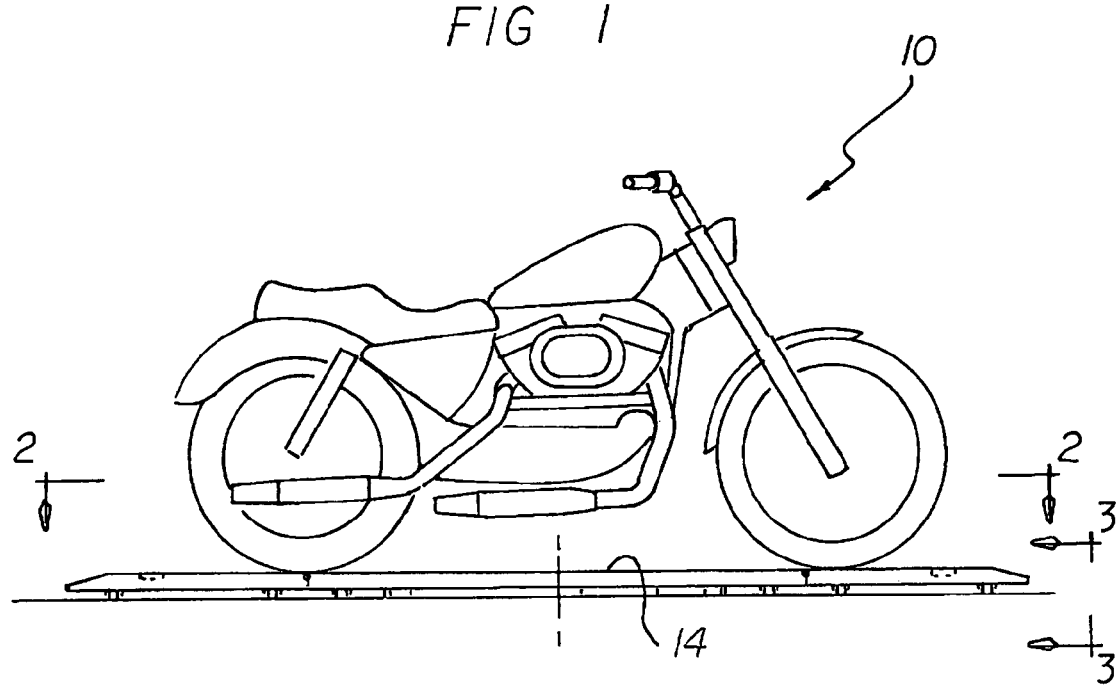
FIG. 1 is a side elevational view of a motorcycle turntable system constructed in accordance with the principles of the present invention.
Figure 2:
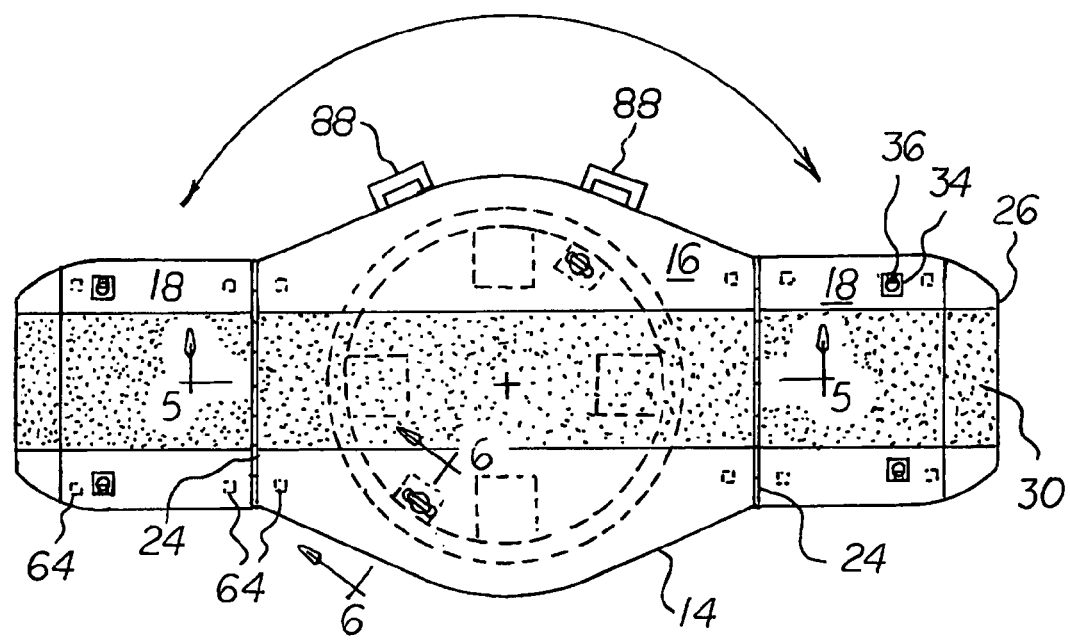
FIG. 2 is a plan view of the system taken at line 2-2 of FIG. 1.

With reference now to the drawings, and in particular to FIG. 1 thereof, the preferred embodiment of the new and improved motorcycle turntable system embodying the principles and concepts of the present invention and generally designated by the reference numeral 10 will be described.

The present invention, the motorcycle turntable system 10 is comprised of a plurality of components. Such components in their broadest context include a rotatable support assembly, a riding strip, a carousel assembly and a locking assembly. Such components are individually configured and correlated with respect to each other so as to attain the desired objective.

Figure 4:
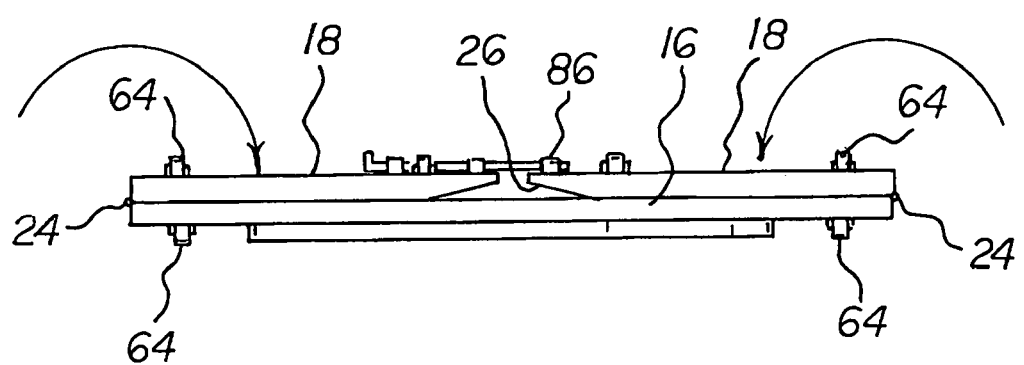
FIG. 4 is a side elevational view similar to FIG. 1 but in a folded orientation.
Figure 5:
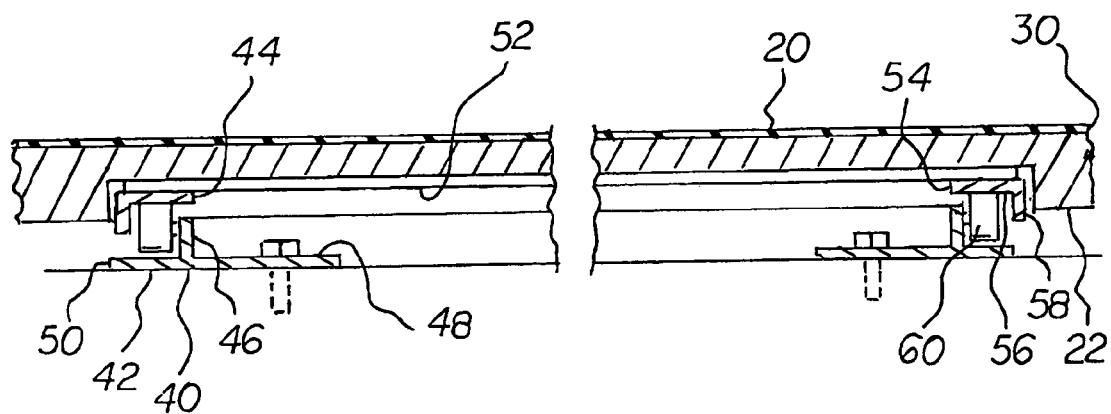
FIG. 5 is a cross sectional view taken along line 5-5 of FIG. 2.
Figure 6:
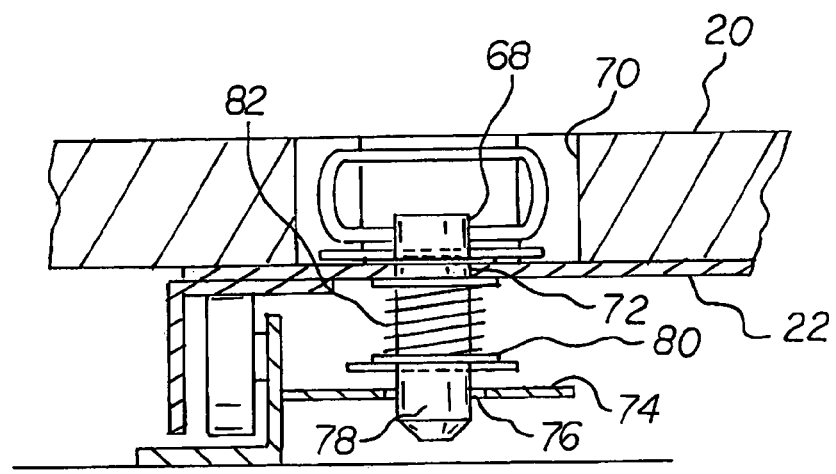
FIG. 6 is a cross sectional view taken along line 6-6 of FIG. 2.
Figure 7:
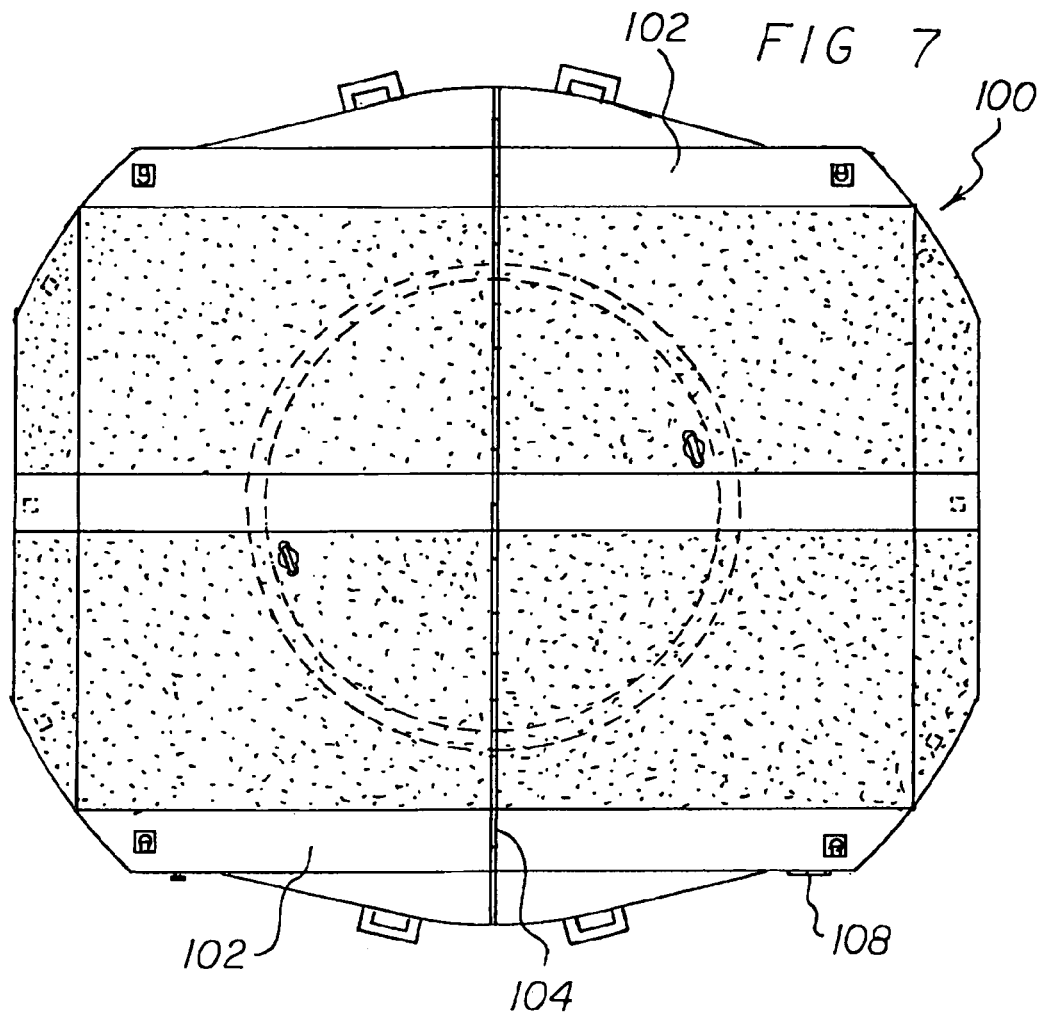
FIG. 7 is a plan view similar to FIG. 2 but illustrating an alternate embodiment of the invention.
Figure 8:
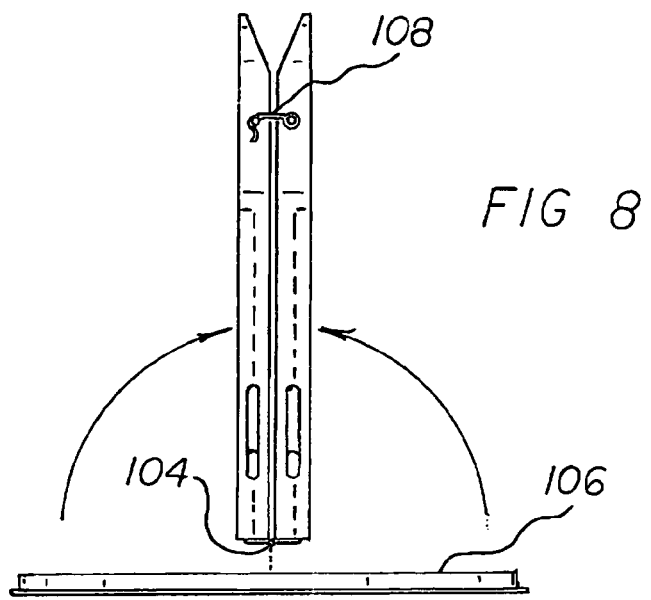
FIG. 8 is a side elevational view of the system shown in FIG. 7 but illustrating the folded orientation.

First provided is a rotatable support assembly 14. The support assembly is formed of a central section 16 and end sections 18. Each section has an upper surface 20 and a lower surface 22. Each section has hinges 24. The hinges pivotably couple the end sections to the central section. In this manner movement is provided between open and folded orientations. The open orientation features the upper surfaces of the central and end sections. The open orientation features end sections in an essentially common extended plane. In this manner supporting and turning is facilitated. Note FIG. 1. The folded orientation features the upper surfaces of the end sections resting upon the upper surface of the central section. In this manner carrying is facilitated. Note FIG. 4. The end sections have tapered end edges 26. The tapered end edges are provided remote from the hinges. The support assembly has a length of about 8 feet. The support assembly has generally square end sections. The support assembly has a width of about 2 feet. The support assembly further has a generally circular central section. The circular central section has a diameter of about 3 feet. The support assembly is fabricated of aluminum.

A riding strip 30 is provided. The riding strip is in a generally rectangular configuration. The riding strip extends over the majority of the upper surface from tapered end edge to tapered end edge. The riding strip is fabricated of an elastomeric material. The elastomeric material is selected from the class of elastomeric materials. The class of elastomeric materials includes plastic and rubber, natural and synthetic, and blends thereof.

Figure 3:
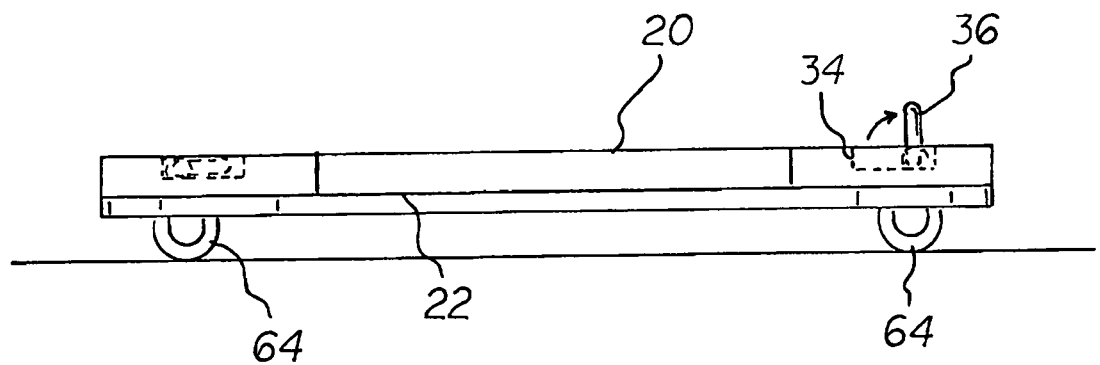
FIG. 3 is a front elevational view taken at line 3-3 of FIG. 1.

Provided next is a plurality of recesses 34. The recesses are formed on the upper surface of each end section. The recesses have a tie down ring 36. The tie down ring is pivotally secured in each recess. Each tie down ring is adapted to be pivoted down into an associated recess. Each tie down ring is further adapted to be pivoted up for receiving a strap. The strap is adapted to hold down a motorcycle on the support assembly. Note FIG. 3.

A carousel assembly 40 is provided. The carousel assembly includes a fixed lower section 42 and a rotatable upper section 44. The lower section has an inner circular vertical wall 46. The lower section has interior and exterior extensions. The interior extensions 48 have apertures. The apertures receive bolts. In this manner securement to a support surface, such as a garage floor, is provided. The exterior extension 50 constitutes a lower ring-like guideway. The upper section has a circular plate 52. The circular plate is fabricated of steel. The circular plate has a circular flange 54. The circular flange is coupled to the circular plate. The circular flange includes an upper ring-like guideway 56. The upper ring-like guideway is provided over the lower ring-like guideway. An outer circular vertical wall 58 is provided. The outer vertical wall is concentric with the inner circular vertical wall. The carousel assembly also includes a plurality of equally spaced rollers 60. The rollers are preferably about 46 in the preferred embodiment. The rollers are rotatably supported on the inner circular vertical wall of the fixed lower section between the inner and outer vertical circular walls. A lower ring-like guideway is provided below and adapted to receive thereon the circular plate and rotatable support assembly.

A plurality of rotatable support casters 64 is provided next. The rotatable support casters depend from the lower surface of each section of the support assembly. The casters and the spaced rollers are adapted to support the weight of the rotatable support assembly and a motorcycle thereon and to maintain the majority of the upper surfaces of the sections at a height of about 2 inches from a support surface. The tapered ends are within 0.25 inches from a support surface.

Further provided is a locking assembly 68. The locking assembly includes a plurality of wells 70. The wells are formed into the upper surface of the central section. Each well has there below an upper aperture 72 through the circular plate and a locking tab 74. A lower aperture 76 is provided. The lower aperture extends from a central extent of the vertical wall of the lower section of the carousel assembly. The locking assembly also includes a pin 78. The pin has a handle and a lower extent. The lower extent extends through the upper and lower apertures. A finger 80 is provided. The finger extends from the pin. A coil spring 82 is provided. The coil spring is provided between the apertures. The coil spring urges the pin downwardly into a locked orientation. In this manner rotation of the support assembly is precluded. The handle is adapted to be raised to lift the pin from the lower aperture. In this manner the support assembly may be rotated to rotate a motorcycle supported thereon.

Provided last is a latch 86. The latch holds the tapered end edges together. Handles 88 are provided on the central section. Then handles facilitate carrying.

An alternate embodiment of the present invention includes a system 100 with a rotatable support assembly. The rotatable support assembly is formed of two similarly configured sections 102. The rotatable support assembly has a hinge 104. The hinge couples the sections. A circular plate 106 is provided. The circular plate is of a one piece construction. The circular plate is separable from the sections. The rotatable support assembly further includes a hook 108. The hook holds the sections together when folded.

In the alternate embodiment, the support assembly has a maximum length of about 5 feet and a generally circular central area having a diameter of about 4 feet. The support assembly is fabricated of aluminum and is adapted to support an all terrain vehicle. In the alternative, the support assembly has a maximum length of about 8 feet and a generally circular central area having a diameter of about 7 feet. The support assembly is fabricated of aluminum and is adapted to support two motorcycles.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A turntable system comprising:
   a rotatable support assembly formed of pivotable sections having upper and lower surfaces and having tapered end edges;
   a riding strip extending over the majority of the upper surface from one of said tapered end edges to another of said tapered end edges and fabricated of an elastomeric material;
   a carousel assembly including a fixed lower section and a rotatable upper section with a plurality of equally spaced rollers between the upper and lower sections; and
   a locking assembly including a plurality of wells formed into the upper surface with a circular plate below having an upper aperture and a locking tab with a lower aperture, the locking assembly also including a pin extending through the upper and lower apertures and a coil spring between the apertures urging the pin downwardly into a locked orientation to preclude rotation of the support assembly.

2. The system as set forth in claim 1 wherein the rotatable support assembly is formed of said pivotable sections which include a central section and similarly configured end sections with hinges coupling the end sections to the central section.

3. The system as set forth in claim 2 wherein the support assembly has a length of about 8 feet with said end sections being generally square end sections having a width of about 2 feet and with said central section being a generally circular central section having a diameter of about 3 feet, the support assembly being fabricated of aluminum and adapted to support a motorcycle.

4. The system as set forth in claim 1 wherein the rotatable support assembly is formed of said pivotable sections which include two similarly configured sections with a hinge coupling the two sections, the circular plate being of a one piece construction and separable from the two sections and further including a hook for holding the two sections together when folded.

5. The system as set forth in claim 4 wherein the support assembly has a maximum length of about 5 feet and a generally circular central area having a diameter of about 4 feet, the support assembly being fabricated of aluminum and adapted to support an all terrain vehicle.

6. The system as set forth in claim 4 wherein the support assembly has a maximum length of about 8 feet and a generally circular central area having a diameter of about 7 feet, the support assembly being fabricated of aluminum and adapted to support two motorcycles.

7. A motorcycle turntable system for supporting and turning motorcycles and other vehicles in a safe and convenient manner comprising, in combination:

a rotatable support assembly formed of a central section and end sections, each section having an upper surface and a lower surface, hinges pivotably coupling the end sections to the central section for movement between open and folded orientations, the open orientation featuring the upper surfaces of the central and end sections in an essentially common extended plane to facilitate supporting and turning, the folded orientation featuring the upper surfaces of the end sections resting upon the upper surface of the central section to facilitate carrying, the end sections having tapered end edges remote from the hinges, the support assembly having a length of about 8 feet with said end sections being generally square end sections having a width of about 2 feet and with said central section being a generally circular central section having a diameter of about 3 feet, the support assembly being fabricated of aluminum;

a riding strip in a generally rectangular configuration extending over the majority of the upper surfaces from one of said tapered end edges to another of said tapered end edges and fabricated of an elastomeric material selected from the class of elastomeric materials including natural or synthetic rubber, plastic, and blends thereof;

a plurality of recesses formed on the upper surface of each end section with a tie down ring pivotally secured in each recess, each tie down ring adapted to be pivoted down into an associated one of said recesses and pivoted up for receiving a strap adapted to hold down a motorcycle on the support assembly;

a carousel assembly including a fixed lower section and a rotatable upper section, the lower section having an inner circular vertical wall with interior extensions and an exterior extension, the interior extensions having apertures to receive bolts for securement to a support surface, the exterior extension constituting a lower ring-like guideway, the upper section having a circular plate fabricated of steel with a circular flange coupled to the circular plate, the circular flange including an upper ring-like guideway over the lower ring-like guideway and an outer circular vertical wall concentric with the inner circular vertical wall, the carousel assembly also including a plurality of equally spaced rollers rotatably supported on the inner circular vertical wall of the fixed lower section between the inner and outer vertical circular walls with the lower ring-like guideway below and adapted to receive thereon the circular plate and rotatable support assembly;

a plurality of rotatable support casters depending from the lower surface of each section of the support assembly, the casters and the spaced rollers adapted to support the weight of the rotatable support assembly and a motorcycle thereon and to maintain the majority of the upper surfaces of the sections at a height of about 2 inches from a support surface with the tapered end edges to within 0.25 inches from a support surface;

a locking assembly including a plurality of wells formed into the upper surface of the central section, each well having there below an upper aperture through the circular plate and a locking tab with a lower aperture extending from a central extent of the vertical wall of the lower section of the carousel assembly, the locking assembly also including a pin with a handle and a lower extent extending through the upper and lower apertures with a finger extending from the pin and a coil spring between the apertures urging the pin downwardly into a locked orientation to preclude rotation of the support assembly, the handle adapted to be raised to lift the pin from the lower aperture whereby the support assembly may be rotated to rotate a motorcycle supported thereon; and a latch to hold the tapered end edges together and handles on the central section to facilitate carrying.

\* \* \* \* \*